United States Patent

Poot

[15] 3,660,094
[45] May 2, 1972

[54] STABILIZATION OF PHOTOGRAPHIC SPIROPYRAN COMPOUNDS

[72] Inventor: Albert Lucien Poot, Kontich, Belgium
[73] Assignee: Gevaert-AGFA N.V., Mortsel, Belgium
[22] Filed: June 22, 1970
[21] Appl. No.: 48,540

[30] Foreign Application Priority Data

July 8, 1969 Great Britain ..................34,430/69

[52] U.S. Cl. ..................................96/48, 96/90 PC
[51] Int. Cl. .............................G03c 5/24, G03c 1/72
[58] Field of Search .............................96/48, 90 PC

[56] References Cited

UNITED STATES PATENTS 3,355,293   11/1967   Foris..................................96/48

*Primary Examiner*—Norman G. Torchin
*Assistant Examiner*—Richard E. Fichter
*Attorney*—Brufsky, Staas, Breiner and Halsey

[57] ABSTRACT

Photographic images formed in a layer of photochromic material upon exposure to actinic light are stabilized so that a more permanent image is obtained by intimately mixing the photochromic material with a stabilizing agent of the formula:

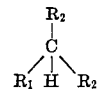

wherein: $R_1$ represents hydrogen, phenyl or phenyl substitute by at least one substituent taken from hydroxyl, carboxyl, halogen, amino, nitro, methoxy, aryloxy, pyridyl and quinone diazide groups, or wherein $R_1$ represents a substituent of the formula:

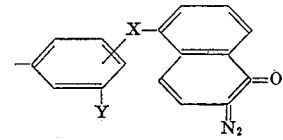

wherein: X stands in ortho, meta or para-position with respect to the free bond of the phenyl group and represents $-OSO_2-$, $-NH-SO_{b0}-$, $-O-CO-$ or $-NH-CO-$ and Y is nitro or methoxy: $R_2$ and $R_3$ represent a phenyl or naphthyl group carrying at least one hydroxyl, methylamino, naphthoquinone-diazidesulphonyloxy or -2-methyl-indolyl group; or $R_2$ and $R_3$ together with the common carbon atom form a di- or tri-phenyl-methane compound with ring closure over an oxygen atom, a sulphur atom, a sulphodioxide group or a substitute or unsubstituted nitrogen atom.

8 Claims, No Drawings

STABILIZATION OF PHOTOGRAPHIC SPIROPYRAN COMPOUNDS

This invention relates to the stabilization of photographic images formed in a layer of photochromic material upon exposure to actinic light and to the stabilized photographic images so obtained.

The term photochromic material as used hereinafter refers to a compound or composition that changes color or opacity when exposed to light. On exposure such photochromic compounds or compositions undergo reversible color changes in such a way that they get colored or change color under the influence of light of certain wavelengths, whereas on irradiation with other wavelengths they show a tendency to revert to the colorless state or to the original color. Though more slowly, the color generally also fades away in the dark. Other photochromic substances usually occurring in colored form are bleached under the influence of actinic light rays, and revert to the original color when exposed to light of different wavelengths or when kept in the dark.

There has been found now a process wherein the transient color brought about under the influence of light is stabilized so that a more permanent color is obtained in the exposed areas.

According to the invention a light-sensitive material is provided which comprises a support and a light-sensitive layer containing a photochromic compound in intimate mixture with a stabilizing agent of the general formula:

wherein:
$R_1$ represents hydrogen, unsubstituted phenyl or phenyl substituted by at least one substituent taken from hydroxyl, carboxyl, halogen, amino, nitro, methoxy, aryloxy, pyridyl and quinone diazide groups or wherein $R_1$ represents a substituent of the formula:

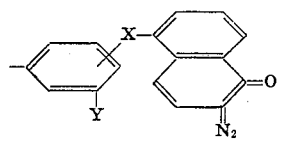

wherein:

X stands in ortho, meta or para-position with respect to the free bond of the phenyl group and represents $-O \cdot SO_2-$, $-NH \cdot SO_2-$, $\cdot O \cdot CO \cdot$ or $\cdot NH \cdot CO \cdot$ and wherein Y represents nitro or methoxy;

$R_2$ and $R_3$, same or different, represent a phenyl or naphthyl group carrying at least on substituent taken from hydroxyl, methyl-amino, naphthoquinonediazidesulphonyloxy or -2-methyl-indolyl groups, or $R_2$ and $R_3$ together with the common carbon atom form a di- or tri-phenylmethane compound with ring closure over an oxygen atom, a sulphur atom, a sulphodioxide group or a substituted or unsubstituted nitrogen atom.

The photochromic materials, which may be used in forming the light-sensitive layer or stratum, belong to a large group of chemical compounds and compositions. A complete survey of these compounds and compositions has been given by Richard Exelby in Chemical Reviews, 65, 247–260 (1965). Among thse the spiro compounds especially the spiropyrans, constitute a very convenient and most preferably class.

Examples of spiropyrans which have proved to be particularly useful are:

1', 3', 3'-trimethyl-6-nitrospiro[2H-1-benzopyran-2,2'-indoline]
1', 3', 3'-trimethyl-5',6-dinitrospiro[2H-1-benzopyran-2,2'-indoline]
6-bromo-1',3',3'-trimethyl-8-nitrospiro[2H-1-benzopyran-2,2'-indoline]
8-bromo-1', 3', 3'-trimethyl-6-nitropsiro[2H-1-benzopyran-2,2'-indo-line]
1'-(2''-hydroxyethyl)-3',3'-dimethyl-6-nitrospiro[2H-1-benzopyran-2,2'-indoline]
6,8-dinitro-3'-phenyl-2,2'-spirobi[2H-1-benzopyran]

Polymeric systems in which photochromic dye structures are chemically bound to or incorporated into the polymer chains constitute a special class of photochromic compounds.

The photochromic compounds are mixed with suitable amounts of stabilizing agents according to the invention.

Stabilizing agents which have proved to be particularly useful are represented in the following table.

TABLE

| No. of compound | $R_1$ | $R_2$ | $R_3$ |
| --- | --- | --- | --- |
| 1 | phenyl | naphthyl-OH | naphthyl-OH |
| 2 | phenyl-OH | Same as above | Same as above |
| 3 | phenyl-OH | do | Do. |
| 4 | phenyl-NH₂ | do | Do. |
| 5 | phenyl-NO₂ | do | Do. |

| No. of compound | R₁ | R₂ | R₃ |
|---|---|---|---|
| 6 | 2-amino-4-hydroxyphenyl (–OH, –NH₂) | do | Do. |
| 7 | 2-nitro-4-hydroxyphenyl (–OH, –NO₂) | do | Do. |
| 8 | 2-methoxy-4-hydroxyphenyl (–OH, –OCH₃) | do | Do. |
| 9 | 2-amino-4-chlorophenyl (Cl, –NH₂) | do | Do. |
| 10 | 2-nitro-4-chlorophenyl (Cl, –NO₂) | do | Do. |
| 11 | 2-amino-3-hydroxy-4-methoxyphenyl (OCH₃, –OH, –NH₂) | do | Do. |
| 12 | pyridyl | 4-hydroxyphenyl (–OH) | 4-hydroxyphenyl (–OH) |
| 13 | 4-(phenoxycarbonyloxy)phenyl (–O–CO–phenyl) | 2-hydroxynaphthyl | 1-iodo-2-hydroxynaphthyl |
| 14 | phenyl-O–SO₂-(2-diazo-1-oxo-naphthyl) | 1-iodo-2-hydroxynaphthyl | Same as above. |
| 15 | 2-methoxyphenyl-O–SO₂-(2-diazo-1-oxo-naphthyl) | Same as above | Do. |
| 16 | 2-diazo-1-oxo-cyclohexadienyl (N₂, =O) | do | Do. |
| 17 | 2-diazo-3-methoxy-1-oxo-cyclohexadienyl (N₂, =O, OCH₃) | do | Do. |
| 18 | phenyl-NH–SO₂-(2-diazo-1-oxo-naphthyl) | do | Do. |

| No. of compound | $R_1$ | $R_2$ | $R_3$ |
|---|---|---|---|
| 19 | ![phenyl-NO2-O-SO2-naphthyl(=O)(=N2)] | ...do... | Do. |
| 20 | ![phenyl-O-SO2-naphthyl(=O)(=N2)] | ...do... | ![methylnaphthyl-O-SO2-naphthyl(=O)(=N2)] |
| 21 | ![phenyl-COOH] | ![phenyl-NH-CH3] | ![phenyl-NH-CH3] |
| 22 | ![phenyl-O-CH3] | ![H3C-C=indole with NH] | ![H3C-C=indole with NH] |
| | | \multicolumn{2}{c}{$R_2$ and $R_3$ taken together} |
| 23 | ![phenyl-OH] | \multicolumn{2}{c}{![xanthene-type structure with two methyl groups]} |
| 24 | ![phenyl-NO2] | \multicolumn{2}{c}{Same as above} |
| 25 | H | \multicolumn{2}{c}{![bis(dimethylamino)phenothiazine-type, with S]} |
| 26 | H | \multicolumn{2}{c}{![bis(dimethylamino)phenothiazine-type, with SO2]} |
| 27 | ![phenyl-N2=O (quinone diazide)] | \multicolumn{2}{c}{![triaryl amine with two naphthyl (methyl substituted) and phenyl groups]} |

The ratio of stabilizing agent to photochromic compound in the light-sensitive layer may vary within wide limits but in general good results will be obtained when for every part by weight of photochromic compound ½ to 10 parts by weight of stabilizing agent are present.

In general the light-sensitive layer will also comprise a binding agent for both the photochromic compound and the stabilizing agent. A large number of binding agents, which can be coated from organic solvents such as acetone, glycol ethyl ether, ethyleneglycol monomethyl ether and which are inert towards the photochromic compound and the stabilizing agent, can be used in forming the light-sensitive layer. Suitable binding agents are e.g. ethylcellulose, polybutyl methacrylate, polymethyl acrylate, and copolymers of vinyl chloride and vinylacetate.

In general a solution in a solvent, or in a mixture of solvents, is formed of binding agent, photochromic compound and stabilizing agent in suitable concentrations and the solution obtained is coated on a support to form the light-sensitive layer of photochromic material. Suitable supports are i.a. metal sheets, glass, cellulose ester films, polystyrene films, polyester films, polycarbonate films, paper either or not coated with a covering layer, e.g. a baryta layer. If needed the different supports may be provided previously with known subbing layers whereon the light-sensitive layer is coated afterwards.

Instead of applying the light-sensitive layer from a solution in an organic solvent of the binding agent, the photochromic compound and the stabilizing agent, a layer may be applied to the support from a solution of the binding agent and the photochromic compound alone. Thereafter the layer formed is soaked with a solution of the stabilizing agent for such a time to allow a sufficient quantity of stabilizing agent to diffuse into the light-sensitive layer.

When exposing such a layer uniformly to actinic light or when exposing it through a line original or screen, the photochromic compound will change color at the exposed areas. Normally such color change would fade out, i.e., on exposure usually to light of a longer wavelength, or during storage in the dark, the color disappears or the original color is formed back again.

However, this is not so when applying the system according to the present invention. The color formed upon exposure is preserved to a large extent. If the exposure was performed through a line original or a screen, a non-fading image is formed from this line original or screen.

The following examples illustrate the present invention.

EXAMPLE 1

A paper support was coated at a ratio of 10 to 30 g/m2 with a layer from the following solution:

| | |
|---|---|
| 1', 3', 3'-trimethyl-6-nitrospiro 8 2H-1-benzopyran-2,2'indoline] | 100 mg |
| 3-nitrobenzylidene-1,1'-di-2-naphthol (compound 5) | 50 mg |
| ethylene glycol monomethyl ether | 2.5 ml |
| acetone | 7.5 ml |

The resulting layer was exposed for 4 min. through a line original by means of an 80 watt high-pressure mercury vapor lamp at a distance of 15 cm. A sharp magenta image was obtained from the line original. The image can be preserved for a long time in the dark without noticeable decrease of the quality.

EXAMPLES 2 to 4

The process of example 1 is repeated, but the 50 mg of stabilizing agent 3-nitrobenzylidene-1,1'-di-2-naphthol were replaced by 100 mg of respectively

[α,α-di(2-hydroxy-1-naphthyl)-o-tolyl] sulphonic acid ester of 6-diazo-5,6-dihydro-5-oxo-1-naphthalene (compound 14)

[3-methoxy-α,α-di(2-hydroxy-1-naphthyl)-p-tolyl]sulphonic acid ester of 6-diazo-5,6-dihydro-5-oxo-1-naphthalene (compound 15)

{α-[2-(2-diazo-1,2-dihydro-1-oxo-5-napthyl-sulphonyloxy)-1-naphthyl]-α -(2-hydroxy-1-naphthyl)-o-tolyl} sulphonic acid ester of 6-diazo-5,6-dihydro-1-naphthalene (compound 20)

In each of three cases a stable magenta image was obtained.

EXAMPLE 5

The process of example 1 was repeated, but the 3-nitrobenzylidene-1,1'-di-2-naphthol was replaced by a same amount of bis(2-methyl-3-indolyl)-methyl-p-anisol (compound 22).

A stable magenta image was obtained.

EXAMPLE 6

A paper support was coated at a ratio of 10 g/m2 with the following solution:

| | |
|---|---|
| 6-bromo-1', 3', 3'-trimethyl-8-nitro-spiro [2H-1-benzopyran-2,2'-indoline] | 100 mg |
| 3-nitrobenzylidene-1,1'-di-2-napthol (compound 5) | 50 mg |
| ethylene glycol monomethyl ether | 2.5 ml |
| acetone | 7.5 ml |

The resulting layer was exposed for 4 min. through a line original by means of an 80 watt high-pressure mercury vapor lamp placed at a distance of 15 cm. A sharp magenta image of the original was obtained. This image can be preserved in the dark without a noticeable decrease of the quality.

EXAMPLE 7

The process of example 6 was repeated, but the spiropyran compound is replaced by a same amount of 6,8-dinitro-3'-phenyl-2,2'-spiro-di[2H-1-benzopyran].

A stable green image was obtained.

EXAMPLE 8

A film support of polyethylene terephthalate or cellulose triacetate was coated at a ratio of 10 g/m2 with the following solution:

| | |
|---|---|
| 1', '', 3'-trimethyl-6nitrospiro- [2H-1 benzopyran-2,2'-indoline] | 500 mg |
| α, α-di(2-hydroxy-1napthyl)-p-tolyl-benzoic acid ester (compound 13) | 500 mg |
| poly-n-butyl methacrylate | 2.5 g |
| acetone | 100 ml |

The resulting layer was exposed for 5 min. through a line original by means of a 125 watt high-pressure mercury vapor lamp placed at a distance of 15 cm. A stable and sharp magenta image was obtained from the original.

I claim:

1. A light-sensitive material comprising a support and a light-sensitive layer containing a photochromic spiropyran compound in intimate mixture with a stabilizing agent in an amount sufficient to impart stabilization to said photochromic compound having the general formula:

wherein:

R₁ represents hydrogen, unsubstituted phenyl or phenyl substituted by at least one substituent taken from hydroxyl, carboxyl, halogen, amino, nitro, methoxy, aryloxy, pyridyl- and quinone diazide groups or wherein R₁ represents a substituent of the formula:

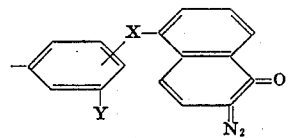

wherein:

X stands in ortho, meta or para-position with respect to the free bond of the phenyl group and represents —O.SO₂—, —NH·SO₂—, —O·CO— or —NH.CO— and wherein Y represents nitro or methoxy;

R₂ and R₃, same or different, represent a phenyl or naphthyl group carrying at least one substituent taken from hydroxyl, methyl-amino, naphthoquinone-diazidesulphonyloxy or -2-methyl-indolyl groups, or R₂ and R₃ together with the common carbon atom form a di- or tri-phenylmethane compound with ring closure over an oxygen atom, a sulphur atom or sulphodioxide group or a substituted or unsubstituted nitrogen atom.

2. A light-sensitive material according to claim 1, wherein for every part by weight of photochromic compound ½ to 10 parts by weight of stabilizing agent are present.

3. A light-sensitive material according to claim 1, wherein the photochromic compound is 1', 3', 3'-trimethyl-6-nitrospiro [2H-1-benzopyran-2,2'-indoline].

4. A light-sensitive material according to claim 1, wherein the photochromic compound is 6-bromo-1', 3', 3'-trimethyl-8-nitro-spiro[2H-1-benzopyran-2,2'-indoline].

5. A light-sensitive material according to claim 1, wherein the photochromic compound is 6,8 dinitro-3'-phenyl-2,2'-spirobi [2H-1-benzopyran].

6. A light-sensitive material according to claim 1, wherein the light-sensitive layer also comprises a binding agent.

7. A light-sensitive material according to claim 6, wherein the binding agent is poly-n-butyl methacrylate.

8. Process for the stabilization of a photographic image formed in a light-sensitive layer of a photochromic spiropyran compound, which comprises intimately mixing the photochromic compound before exposure to actinic light with a stabilizing agent in an amount sufficient to impart stabilization to said photochromic compound having the general formula:

wherein:
R₁ represents hydrogen, unsubstituted phenyl or phenyl substituted by at least one substituent taken from hydroxyl, carboxyl, halogen, amino, nitro, methoxy, aryloxy, pyridyl- and quinone diazide groups or wherein R₁ represents a substituent of the formula:

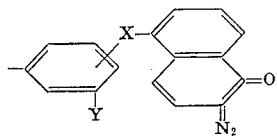

wherein:
X stands in ortho, meta or para-position with respect to the free bond of the phenyl group and represents —O·SO₂—, —NH·SO₂—, —O·CO— or —NH·CO— and wherein Y represents nitro or methoxy;

R₂ and R₃, same or different, represent a phenyl or naphthyl group carrying at least one substituent taken from hydroxyl, methylamino, naphthoquinone-diazidesulphonyloxy or -2-methylindolyl groups, or R₂ and R₃ together with the common carbon atom form a di- or tri-phenylmethane compound with ring closure over an oxygen atom, a sulphur atom or sulphodioxide group or a substituted or unsubstituted nitrogen atom.

* * * * *